(12) United States Patent
Sanderson et al.

(10) Patent No.: US 7,916,983 B2
(45) Date of Patent: Mar. 29, 2011

(54) SIGNAL IDENTIFYING APPARATUS FOR AN OPTICAL FIBER

(75) Inventors: Jim Sanderson, Moore, SC (US); Jianxun Fang, Concord, NH (US)

(73) Assignee: AFL Telecommunications LLC, Spartanburg, SC (US)

( * ) Notice: Subject to any disclaimer, the term of this patent is extended or adjusted under 35 U.S.C. 154(b) by 159 days.

(21) Appl. No.: 12/280,921

(22) PCT Filed: Nov. 15, 2007

(86) PCT No.: PCT/US2007/084794
§ 371 (c)(1),
(2), (4) Date: Aug. 27, 2008

(87) PCT Pub. No.: WO2008/064064
PCT Pub. Date: May 29, 2008

(65) Prior Publication Data
US 2009/0028490 A1 Jan. 29, 2009

Related U.S. Application Data

(60) Provisional application No. 60/866,302, filed on Nov. 17, 2006.

(51) Int. Cl.
*G01N 21/00* (2006.01)
*G02B 6/00* (2006.01)
(52) U.S. Cl. .......................... 385/12; 385/147; 356/73.1

(58) Field of Classification Search ....................... None
See application file for complete search history.

(56) References Cited

U.S. PATENT DOCUMENTS

| 3,931,518 | A |   | 1/1976  | Miller |
|-----------|---|---|---------|--------|
| 5,009,479 | A | * | 4/1991  | Morrison ........................ 385/15 |
| 5,067,786 | A | * | 11/1991 | Hawkins et al. ................. 385/13 |
| 5,138,690 | A |   | 8/1992  | Cox |
| 5,519,795 | A |   | 5/1996  | Bender et al. |
| 5,537,500 | A | * | 7/1996  | Yokoyama ...................... 385/31 |
| 5,708,499 | A |   | 1/1998  | Baden et al. |
| 5,742,715 | A |   | 4/1998  | Boehlke et al. |
| 6,137,780 | A | * | 10/2000 | Darcie et al. ................... 370/248 |
| 6,406,196 | B1| * | 6/2002  | Uno et al. ....................... 385/89 |
| 6,590,659 | B2|   | 7/2003  | Melnyk et al. |
| 6,912,085 | B2| * | 6/2005  | Hakomori et al. ........ 359/341.41 |
| 7,187,861 | B2| * | 3/2007  | Ruchet ............................. 398/9 |
| 2003/0113118 | A1 |  | 6/2003 | Bartur |

OTHER PUBLICATIONS

OFI Optical Fiber Identifier User's Guide.

* cited by examiner

*Primary Examiner* — Michelle R Connelly Cushwa
(74) *Attorney, Agent, or Firm* — Sughrue Mion, PLLC (57) ABSTRACT

Provided is a signal identifying apparatus for an optical fiber that includes a detecting portion capable of detecting a signal originating from a first end of the optical fiber and a signal originating from a second end of the optical fiber. Additionally, the signal identifying apparatus includes an identifying portion that identifies a desired signal by separating the signal originating from the first end of the optical fiber from the signal originating from the second end of the optical fiber.

28 Claims, 8 Drawing Sheets

SIGNAL IDENTIFYING APPARATUS FOR AN OPTICAL FIBER

This application claims the priority of U.S. Provisional Application No. 60/866,302 filed on Nov. 17, 2006, in the United States Patent and Trademark Office the contents of which are hereby incorporated by reference.

BACKGROUND OF THE INVENTION

1. Field of the Invention

The present invention relates to fiber optic communication systems. In particular, embodiments of the present invention relate to apparatuses and methods that can be used to detect the presence of high speed data from an active component in a passive optical network.

2. Description of the Related Art

Conventional Optical Fiber Identifiers (OFIs) are rugged, handheld, and easy-to-use fiber optic test instruments designed to detect optical signals transmitted through an optical fiber without disrupting traffic.

One type of optical fiber identifier that can be used to test optical fibers uses the principle of macrobending. A macrobend device is one that imposes a large physical distortion on the fiber, by, for example, causing the fiber to conform to the shape of a bending part. By bending the fiber around a bending part, the macrobend optical fiber identifier can detect light which escapes the fiber at the bend.

Another type of device used to identify optical fibers is a microbend device. A microbend device imposes a small bend on the optical fiber in relation to the physical dimensions of the fiber.

During installation, maintenance, rerouting, or restoration, it is often necessary to isolate a specific fiber. By simply clamping an OFI unit onto a gently bent fiber, the unit will indicate whether the fiber is in use. More specifically, a related art OFI may be able to detect if there is a signal, tone, or traffic present on the fiber and identify the signal direction, if any.

Figure 1:
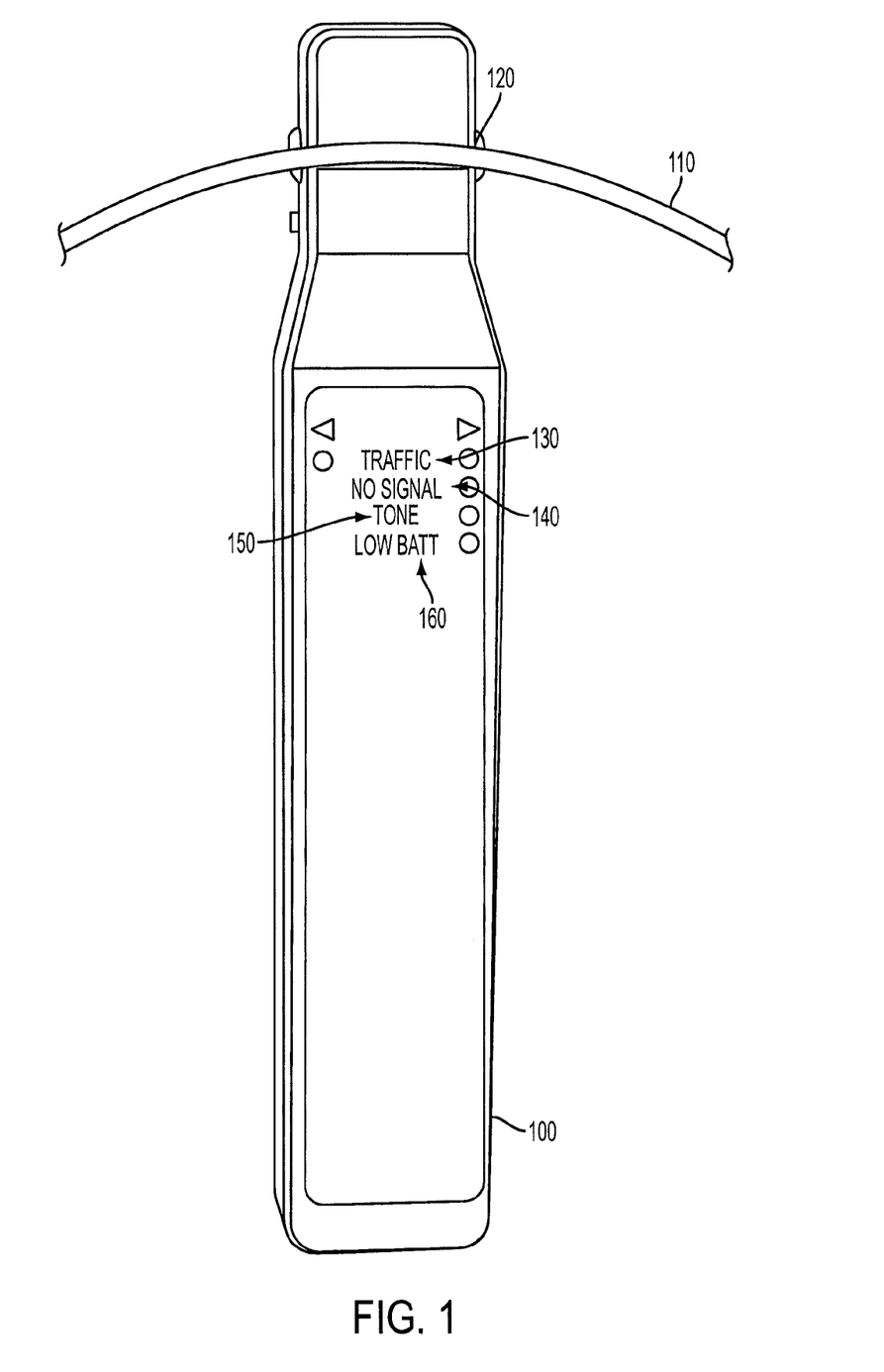
FIG. 1 is an example of a related art optical fiber identifier.

An example of a related art Optical Fiber Identifier can be seen in FIG. 1. The Optical Fiber Identifier (100) of FIG. 1 includes a fiber groove (120), into which the fiber (110) is inserted for signal detection. Additionally, the OFI (100) of FIG. 1 includes a plurality of signal indicators, such as, for example, Traffic indicator (130), No Signal indicator (140), Tone indicator (150) and Power indicator (160).

The No Signal indicator (140) indicates that no light has been detected in the optical fiber. The Traffic indicator (130) indicates that light is present on the fiber, and may also indicate the direction of the light. The Power indicator (160) simply alerts the user if the battery needs to be changed. The Tone indicator (150) may indicate the presence of a tone signal. In the related art, a tone signal can be used to select a fiber from a plurality of fibers. Typically, this involves connecting one end of an unknown fiber to a light source at one location and injecting a predetermined tone signal. Commonly a light source that generates 270 hz, 1 Khz and 2 Khz signals is used as the tone generator. A tone signal is typically a square wave that has a 50% duty cycle, however, other duty cycles may be used. Next, a related art OFI, such as OFI (100), is clamped onto a bundle of unknown fibers at the other location. If the OFI detects the predetermined light signal, for example 2 Khz, the fiber is identified.

With regard to duty-cycles, this can be understood as the percentage of time the signal is above a threshold. For example, the duty cycle of a light signal may be the percentage of time that light is transmitted through the fiber.

Optical fiber identifiers, such as OFI (100), are normally set to have a very large sensitivity but a rather small bandwidth. More specifically, the bandwidth is usually set to be between 0 and 2 Khz. Since these OFIs are designed to detect 2 Khz or less, there is no reason to make the bandwidth any greater than 2 Khz. Moreover, electrical noise in a circuit is directly proportional to the bandwidth, thus, the bandwidth is selected to be no more than that which is necessary. In another approach to increasing sensitivity, related art optical fiber identifiers typically rely on DC-coupling, as AC-coupling may negatively impact signals at low frequencies.

However, new high speed fiber optic communication systems, such as passive optical networks (PONs), are now being deployed to businesses and residential areas around the world. In these new systems, the rates of data transmission are high, for example, greater than 155 Mbps. Because related art OFIs, such as those described above, have a limited amount of bandwidth, these OFIs have only a limited value in the new high speed systems. In particular, because the OFI described above is set to detect only low speed signals, high speed signals are only displayed only as an average of the time light is present on the fiber and the time no light is present. Consequently, the OFI is not able to detect the direction of a signal with the accuracy required.

Consider the situation where one end of the optical fiber under test is connected and the other end is disconnected. In this case the OFI described above may indicate that there is traffic and would give no indication that there is an obvious problem with this disconnected fiber. Because the OFI described above has only a limited bandwidth, and the duty cycle of the new high speed fiber optic systems can be very small, the OFI described above may be able to provide an average power, but cannot accurately detect the upstream PON signals being transmitted through the optical fiber.

Accurately detecting disconnected optical fibers can be essential for a high speed network provider. That is, without an ability to accurately detect and identify disconnected fibers, it is very difficult for the network provider to keep accurate records of who is connected and who is not connected to their network. Much like the phone system, an individual fiber is brought to a box on the side of an individual business/residence. At the business/residence, the fiber may or may not be connected to the network inside the structure, similar to traditional phone and cable TV systems. Now consider the situation where a customer subscribes to this high speed network and then decides to discontinue service. At this time, the provider simply disconnects this fiber at box on the side of the business/house. Now, unless the provider's database is updated, the provider has a lost fiber at the distribution point for this business/residence. In particular, unless the line is physically disconnected at the distribution point and an alarm goes off in the provider's network, the provider has lost a line. Disconnecting lines and checking for alarms is time consuming and can temporarily disrupt service to customers.

As such, there is need for an optical fiber identifying device which can accurately detect the presence or absence of a predetermined high speed signal on an optical fiber.

SUMMARY OF THE INVENTION

Exemplary embodiments of the present invention overcome the above disadvantages and other disadvantages not described above and provide advantages which will be apparent from the following description of exemplary embodiments of the invention. However, the present invention is not required to overcome the disadvantages described above.

According to one exemplary embodiment of a signal identifying apparatus for an optical fiber, the apparatus may include a detecting portion that detects a signal originating from a first end of the optical fiber and a signal originating from a second end of the optical fiber; and an identifying portion that identifies a desired signal by separating the signal originating from the first end of the optical fiber from the signal originating from the second end of the optical fiber. In this exemplary embodiment, the identifying portion and the detecting portion may be AC-coupled or DC-coupled.

In this exemplary embodiment, the signal originating from the first end of the optical fiber may be an upstream signal and the signal originating from the second end of the optical fiber may be a downstream signal, wherein the two signals may have different frequencies. Additionally, the desired signal may be the upstream or downstream signal.

In this exemplary embodiment, the identifying portion may be a filter, such as, for example, a low pass filter, or a band pass filter, and the parameters of the filter correspond to the desired signal. Exemplary parameters of the filter that can be adjusted include duty cycle of the desired signal and bandwidth of the desired signal. Additionally, this exemplary embodiment of the signal identifying apparatus may include a mixing portion that combines the signal originating from the first end of the optical fiber and the signal originating from the second end of the optical fiber into a mixed signal.

In this exemplary embodiment of the signal identifying apparatus, the signal originating from the first end of the optical fiber may be a burst of short pulses and the signal originating from the second end of the optical fiber may be a series of short pulses. Furthermore, the signal identifying apparatus of this exemplary embodiment may include a power detector that measures peak power of the signal originating from the first end of the optical fiber and peak power of the signal originating from the second end of the optical fiber.

In another exemplary embodiment, the signal identifying apparatus for an optical fiber may include a detecting portion that detects a signal originating from a first end of the optical fiber and a signal originating from a second end of the optical fiber, wherein the signal originating from the first end of the optical fiber is an upstream signal and the signal originating from the second end of the optical fiber is a downstream signal; a mixing portion that combines the upstream signal and the downstream signal; and an identifying portion that identifies a desired signal by separating the upstream signal and the downstream signal.

Other exemplary embodiments may be directed to methods of identifying signals in an optical fiber. For example, one method includes detecting a signal originating from a first end of the optical fiber; detecting a signal originating from a second end of the optical fiber; and identifying a desired signal by separating the signal originating from the first end of the optical fiber from the signal originating from the second end of the optical fiber.

According to this exemplary embodiment the signal originating from the first end of the optical fiber is separated from the signal originating from the second end of the optical fiber according to parameters of the desired signal. Examples of these parameters include the duty cycle of the desired signal and the bandwidth of the desired signal. More specifically, in one exemplary embodiment, the signal originating from the first end of the optical fiber is separated from the signal originating from the second end of the optical fiber using a low pass filter or a band pass filter, but is not limited to the above.

According to this exemplary embodiment, the method may also include combining the signal originating from the first end of the optical fiber and the signal originating from the second end of the optical fiber into a mixed signal. Furthermore, the method of this exemplary embodiment may include measuring peak power of the signal originating from the first end of the optical fiber and peak power of the signal originating from the second end of the optical fiber.

BRIEF DESCRIPTION OF THE DRAWINGS

The above and other features and advantages of the present invention will become more apparent from detailed exemplary embodiments set forth hereinafter with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown. Like reference numerals in the drawings denote like elements.

Figure 2:
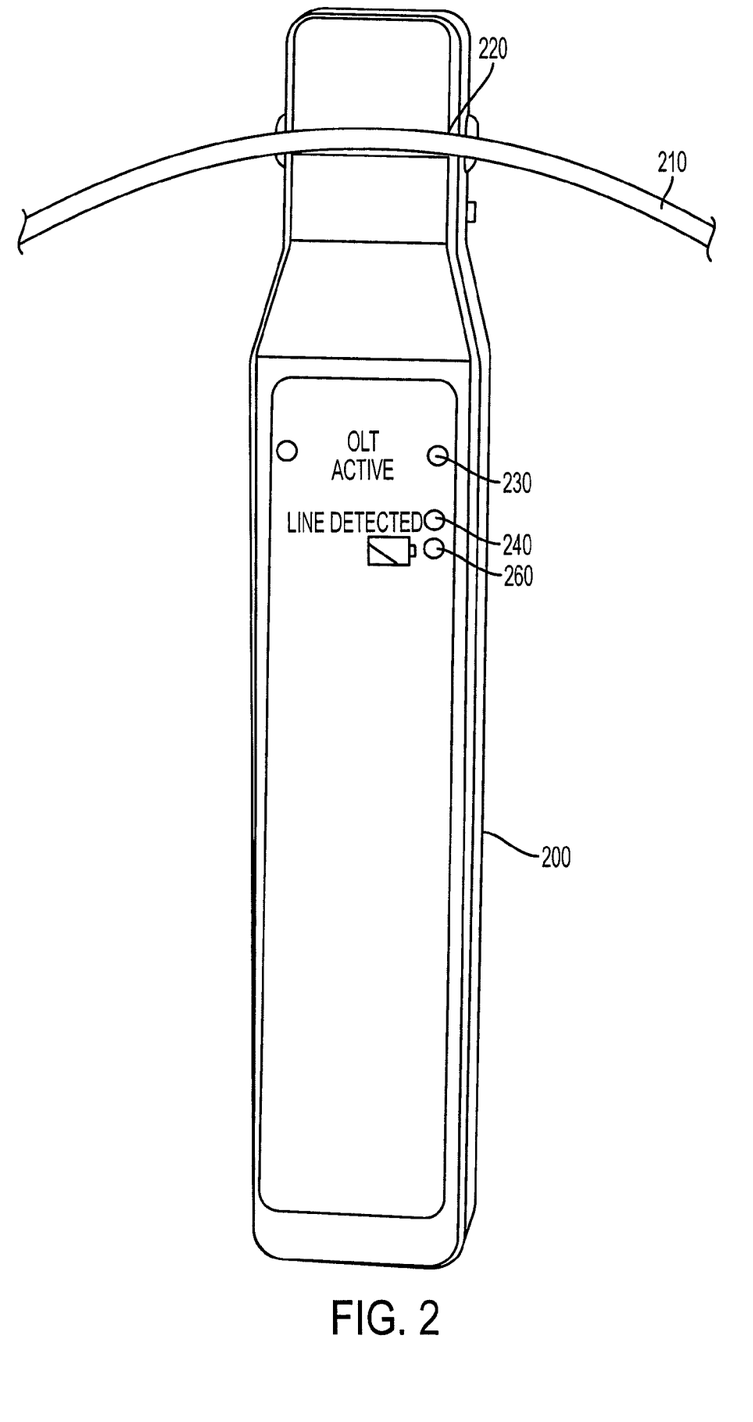
FIG. 2 is an example of an optical fiber identifier according to one exemplary embodiment of the present invention.

Referring to FIG. 2, there is disclosed an Optical Fiber Identifier according to an exemplary embodiment of the present invention. The Optical Fiber Identifier (200) of FIG. 2 includes a fiber groove (220), into which the fiber (210) is inserted for signal detection. Additionally, the OFI (200) of FIG. 2 includes a plurality of signal indicators, such as, for example, Desired Signal indicator (230), No Signal indicator (240) and Power indicator (260).

One exemplary embodiment of the present invention is a new class of optical fiber identifier; one that will detect the presence of high speed data from an active component in an optical network. For this purpose, an exemplary embodiment of the OFI has both a large gain and a large bandwidth so that it may detect the high speed signal. A large gain is required because only a small portion of the light will be used by the identifier. The $\text{OFI}_{FTTX}$ is an optical fiber identifier, which, according to one exemplary embodiment of the present invention, can be used in optical fiber systems such as, for example, fiber to the home (FTTH), fiber to the premise (FTTP) or fiber to the curb systems (FTTC), collectively (FTTX).

Figure 3:
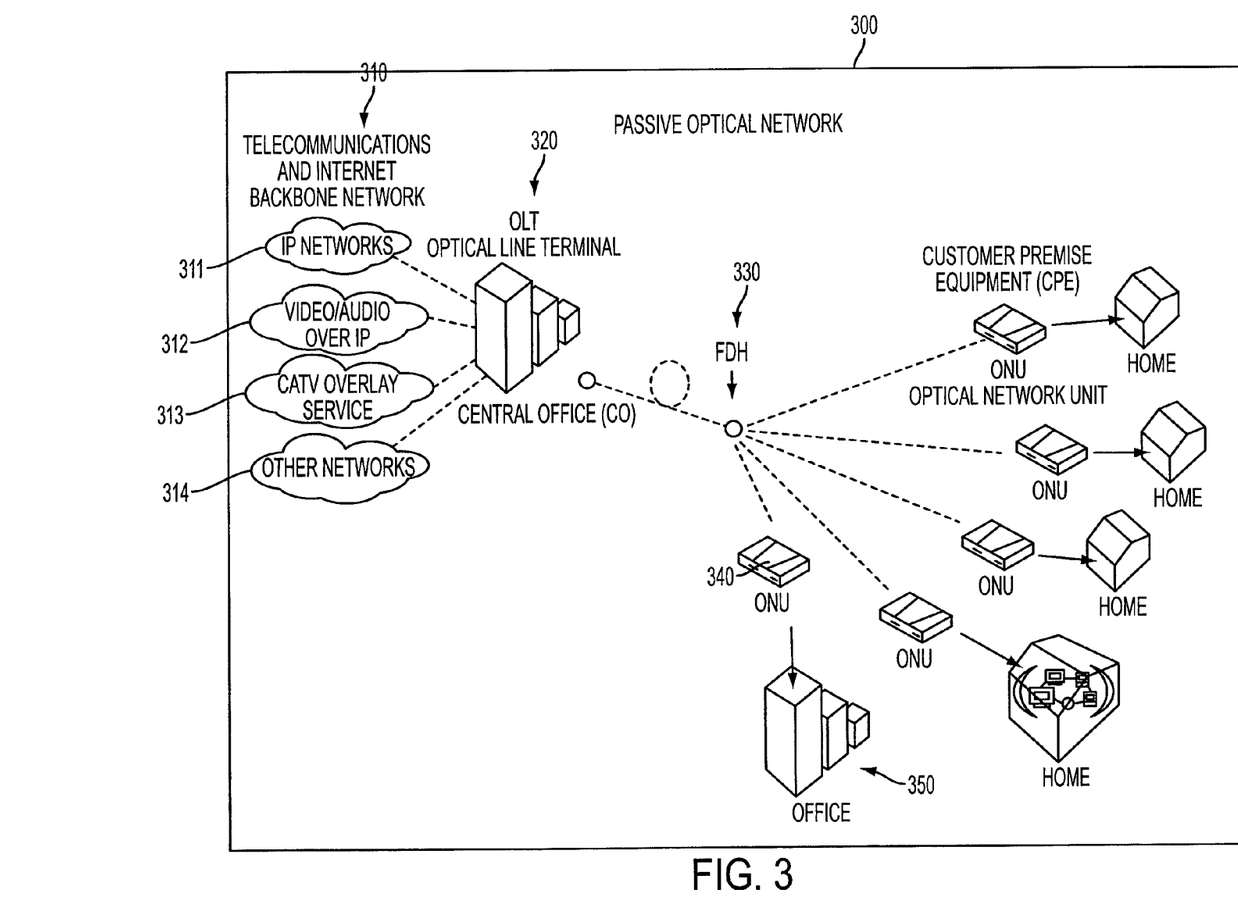
FIG. 3 is an example of a passive optical network in a fiber optic communication system.

FIG. 3 shows an example of a Passive Optical Network (PON) (300) in a high speed optical fiber communication system. The PON (300) comprises a Telecommunications and Internet Backbone network (310) being connected to an Optical Line Terminal (OLT) (32). The Telecommunications and Internet Backbone network (310) can include, but is not limited to, Internet Protocol (IP) Networks (311), Video/Audio over IP (312), Cable Television (CATV) Overlay service (313) and Other networks (314). In this example, the OLT (320) is connected to a fiber distribution hub (FDH) (330) which splits the signal coming from the OLT (320) and sends the signal to a plurality of customers. The signal originating from the OLT (320) and being sent to the customer is hereinafter referred to as a "downstream" signal.

The PON (300) of FIG. 3 also includes customer premise equipment (CPE) such as an optical network unit (ONU) (340) or an optical network terminal (ONT) (not pictured). It will be understood that any type of customer service equipment may be used, however, hereinafter, the description will be limited to the ONU (340). The ONU (340) also sends a signal back to the OLT (320). The signal originating at the ONU (340) and being sent to the OLT (320) is known as the "upstream" signal.

In at least one embodiment of the passive optical network, the upstream signal may have a different frequency from the downstream signal. For example, the frequency of the upstream signal maybe higher than the frequency of the downstream signal. More specifically, in one exemplary embodiment, the downstream signal may have wavelengths of 1490 nm or 1550 nm, while the upstream signal may have a wavelength of 1310 nm.

Figure 4:
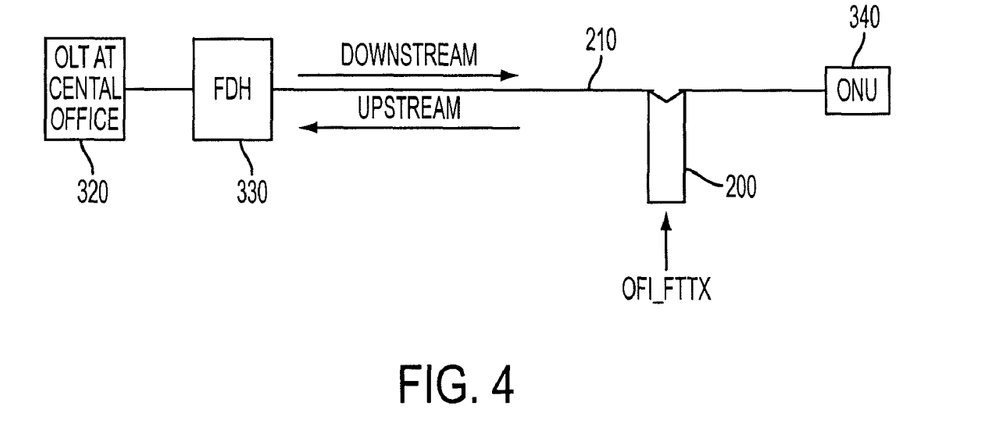
FIG. 4 is an example of measuring the upstream and downstream signals using an optical fiber identifier according to an exemplary embodiment of the present invention.

FIG. 4 is an example of measuring the upstream and downstream signals using an optical fiber identifier according to an exemplary embodiment of the present invention. In one exemplary embodiment, the $OFI_{FTTX}$ is attached to the optical fiber, such as optical fiber (210) shown in FIG. 2, between the FDH (330) and the ONU (340). In this manner, the $OFI_{FTTX}$ can be used to detect the upstream and downstream signals.

In one exemplary embodiment, the $OFI_{FTTX}$ serves as an active device (ONU) indicator. In other words, in this exemplary embodiment, the $OFI_{FTTX}$ can detect the upstream signal originating from the ONU (340) without disconnecting the optical fiber. If an upstream signal is present, the optical fiber (210) is likely connected to the ONU (340) and the optical fiber line is in use. In this regard, the $OFI_{FTTX}$ according to an exemplary embodiment of the present invention allows a high speed network provider to find lost lines and detect low power levels at the FDH (330) without disconnecting the fibers, looking for alarms or checking each subscriber's ONU (340) individually. This will save a high speed provider time, money and customer complaints, without disrupting their system.

With regard to the downstream signal, in the exemplary embodiment of the invention described above, the downstream signal is minimized. That is, the $OFI_{FTTX}$ will identify the upstream signal among the traffic present on the optical fiber. As such, for the purpose of at least one exemplary embodiment of the $OFI_{FTTX}$, the downstream signal amounts to noise which must be filtered out. However, embodiments of the present invention are not limited to the above. In other words, other exemplary embodiments of the present invention may identify the downstream signal while minimizing the upstream signal. Additionally, other embodiments of the present invention may accurately identify both the upstream and downstream signal, and indicate the direction of each signal to the user. Moreover, a plurality of signals may travel upstream or downstream on the optical fiber. In one exemplary embodiment of the present invention, a plurality of signals may be detected, or the signal to be identified may be chosen by the user.

The $OFI_{FTTX}$ according to one exemplary embodiment of the present invention avoids the problem of excessive noise, by utilizing large area photo detectors and then amplifying the signal. In this exemplary embodiment excessive noise due to unwanted signals is also avoided by tailoring the gain bandwidth around the upstream signal.

Figure 5:
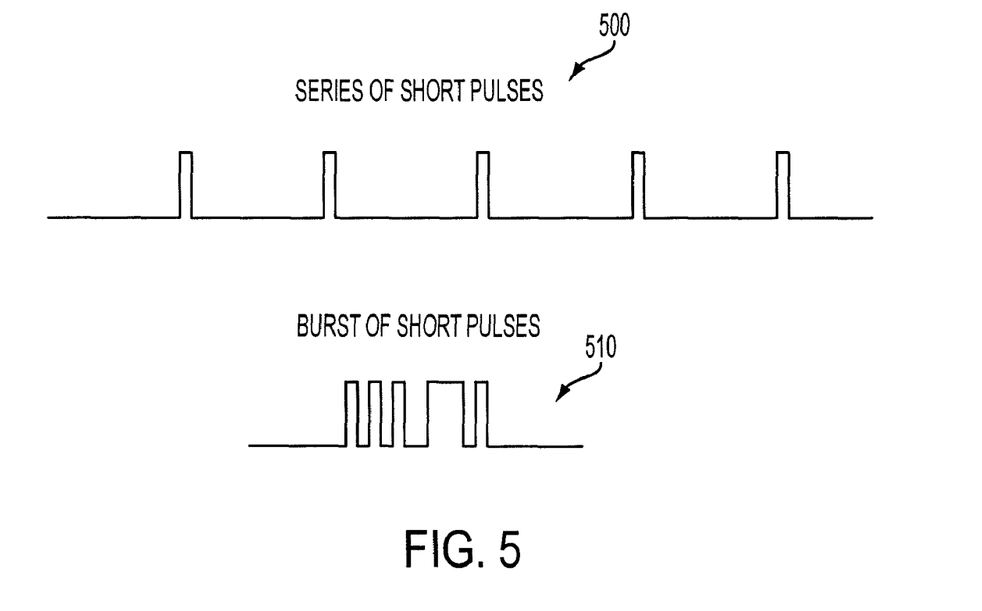
FIG. 5 is an example of the difference between the upstream and downstream signal in the optical fiber according to one exemplary embodiment of the present invention.

The upstream and downstream signals will now be described in more detail. FIG. 5 shows an example of an upstream and a downstream signal. As can be seen in FIG. 5, the downstream signal consists of a series of relatively evenly spaced very short pulses while the upstream signal consists of a large burst of very short pulses.

By relying on the difference between the upstream and downstream signals, the $OFI_{FTTX}$, in one exemplary embodiment of the present invention, can identify the desired signal from the signals present on the optical fiber. That is, in one exemplary embodiment, the upstream burst can be detected if the receiver of the $OFI_{FTTX}$ is AC-coupled and has a bandwidth that is large enough to detect the burst envelope of the burst pulses, but too small to detect the downstream series of pulses. In other words, in this exemplary embodiment, the bandwidth of the receiver of the $OFI_{FTTX}$ is set to detect the signal being transmitted from the ONU (340), the upstream signal. AC-coupling the $OFI_{FTTX}$ is one exemplary way to eliminate any low frequency signals and miscellaneous offsets that appear in our receiver, however, other exemplary embodiments of the present invention may involve an $OFI_{FTTX}$ receiver that is DC-Coupled.

According to one exemplary embodiment of the present invention, the bandwidth of the $OFI_{FTTX}$ is set to be large enough that, if a burst of pulses passes through the receiver of the $OFI_{FTTX}$ a burst envelope of the upstream signal will be detected. However, if a series of short pulses, such as the downstream signal shown in FIG. 5, passes through the $OFI_{FTTX}$ receiver, it will cause only a small disturbance in the noise floor of the detected signal. In other words, by setting the bandwidth according to the signal to be identified, the receiver can filter out the downstream pulses and retain only the upstream burst of pulses.

Figure 6:
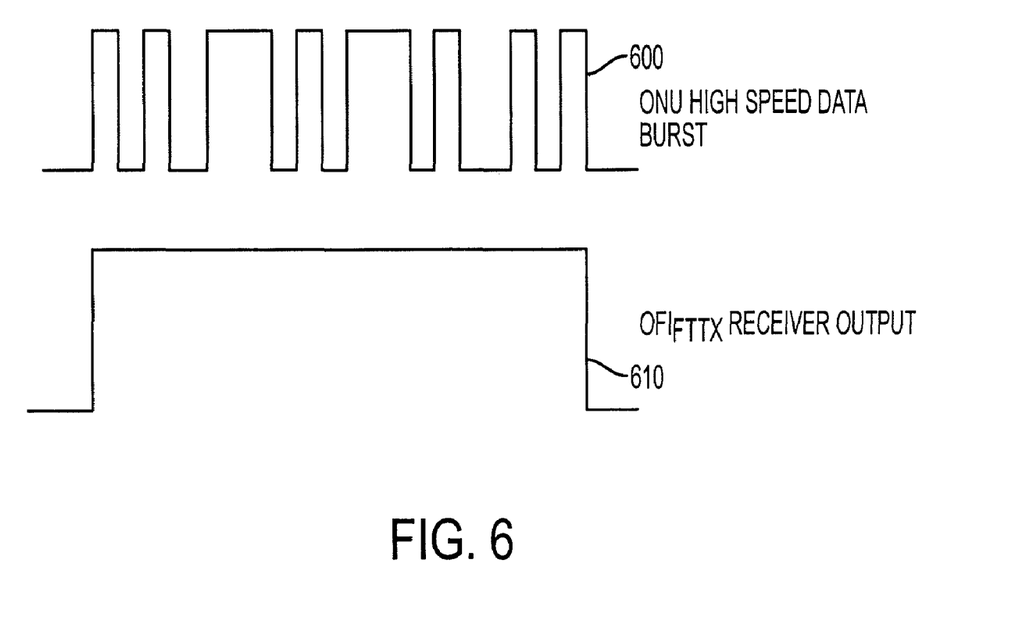
FIG. 6 is an example of high speed data burst from an optical network unit and an example of the output of the optical fiber identifier according to an embodiment of the present invention.

An example of a burst envelope of the upstream signal can be seen in FIG. 6. As shown in FIG. 6, the burst of pulses has about a 50% duty-cycle. Although various duty cycles can be used, most modern communication systems including FTTX systems keep the duty cycle at approximately 50% through a series of pseudo-random algorithms. The $OFI_{FTTX}$ according to at least one embodiment of the present invention uses the duty cycle to calculate the minimum bandwidth for detecting the desired, for example upstream, signal. In this exemplary embodiment, the minimum burst time is assumed to be equivalent to a single pulse with a pulse width of approximately 50% of the burst of pulses. Additionally, it is assumed that the downstream pulses are signals which have a significantly shorter pulse width than the upstream bursts. As such, the minimum bandwidth of the signal to be detected needs to be set to produce a pulse envelope (see for example reference number 610 in FIG. 5) equal to that of a single pulse with a pulse width of approximately 50% of the burst of pulses.

Although in one exemplary embodiment the duty-cycle of the burst of pulses, i.e. the pulses making up the burst envelope, in the upstream signal, is approximately 50%, the overall duty cycle of this signal can be very small, in some cases less than 1%. In other words, the actual burst of pulses amounts to only a small portion of the overall signal. Thus the desired signal to be identified from the traffic on the optical fiber will typically have a very small duty-cycle ratio.

If the burst of pulses, such as the one shown in FIG. 6, is present, the $OFI_{FTTX}$ receiver will output a burst envelope that corresponds to the burst of pulses. An example of the burst envelope is also shown in FIG. 6. By sending a burst of pulses through the $OFI_{FTTX}$ filter with a bandwidth less than that of the desired signal, the result is a burst envelope that has a height that is proportional to the duty cycle and a width that is approximately the same as the burst of pulses. In one exemplary embodiment, the filter of the $OFI_{FTTX}$ is a low pass filter adjusted to filter out the undesired signals. However, it will be understood that any kind of filter can be used, as long as the desired signal is identified, and the undesired signals are suppressed.

In addition to the upstream and downstream signals, other signals may be present within the fiber. For example, optical fibers in may contain analog video overlay signals. These signals correspond to, for example, cable television signals. By accurately setting the bandwidth to be detected by the receiver of the $OFI_{FTTX}$, the optical fiber identifier avoids erroneous detection of undesired signals present within the fiber. In other words, even though some light signals may be present on the optical fiber, if the desired signal is not detected among the signals, the $OFI_{FTTX}$ according to one exemplary embodiment of the present invention will indicate that no signal present on the fiber. That is, the $OFI_{FTTX}$ according to one exemplary embodiment of the present invention does not simply detect high speed signals, but is adjusted to seek the signal desired by the user.

Figure 8A:
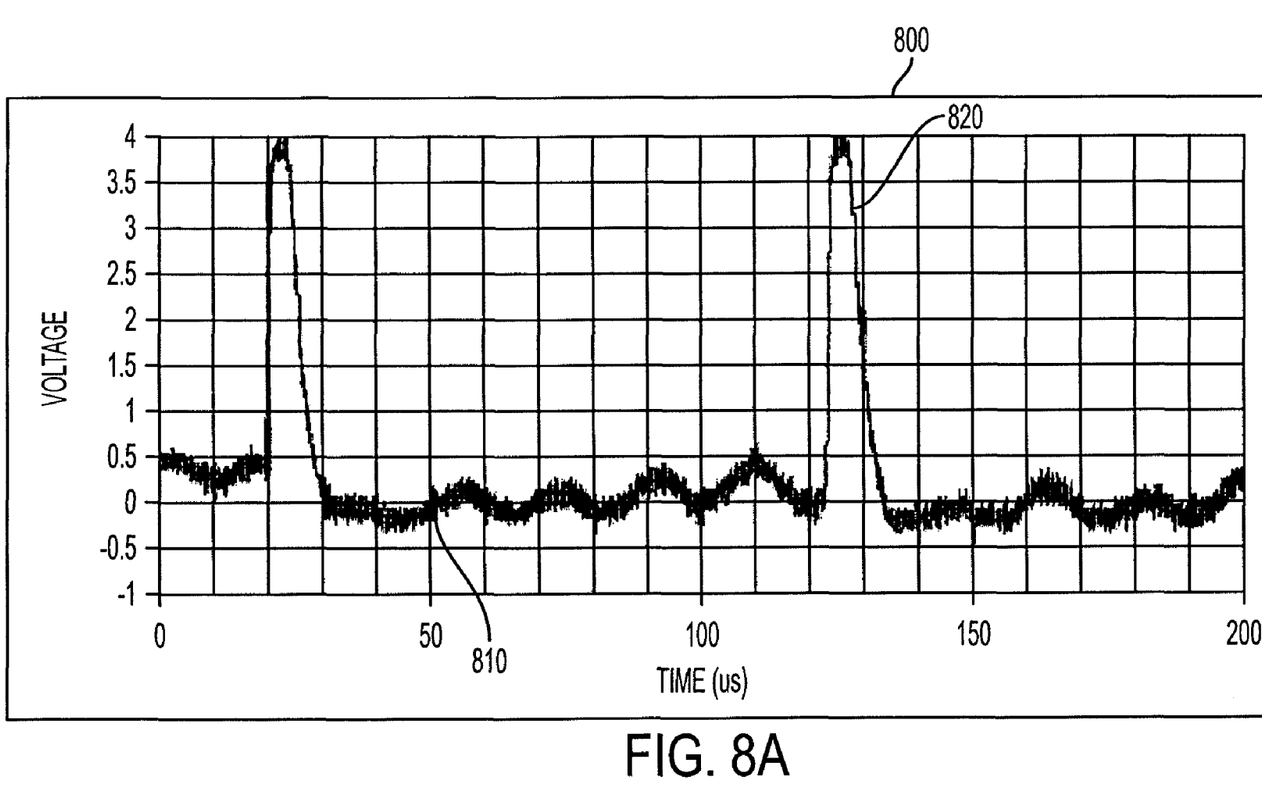
FIG. 8A is an example of the desired signal being detected by the optical fiber identifier according to one exemplary embodiment of the present invention.
Figure 8B:
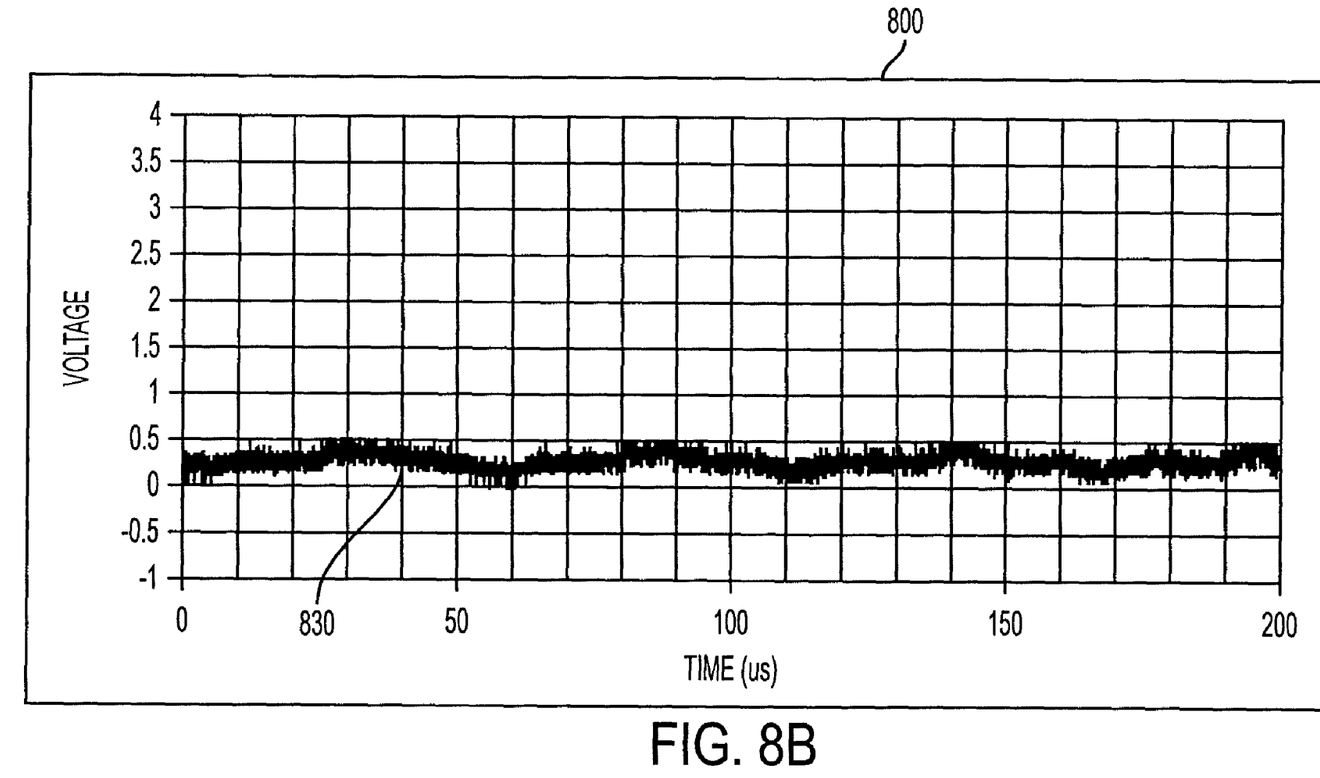
FIG. 8B is an example of the optical fiber system wherein the desired signal is not present.

FIG. 8A shows an example of the desired signal being detected by the $OFI_{FTTX}$ according to one exemplary embodiment of the present invention. In FIG. 8, the burst envelope is represented as the high peak (820), while any noise, such as for example, the undesired signals, is limited to the floor of the signal (810). Next, if the $OFI_{FTTX}$ does not detect the desired signal, the output of the receiver will indicate that no signal (830) is present. See, for example, FIG. 8B.

Figure 7:
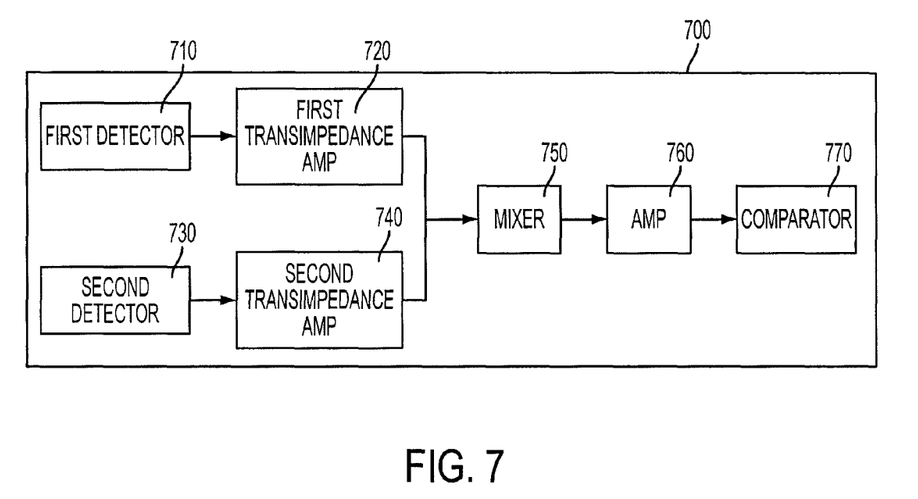
FIG. 7 is a schematic overview of the optical fiber identifier according to one exemplary embodiment of the present invention.

FIG. 7 is a schematic overview of the $OFI_{FTTX}$ according to one exemplary embodiment of the present invention. In the exemplary embodiment shown in FIG. 7, the $OFI_{FTTX}$ (700) includes a first detector (710) connected to a first transimpedence amplifier (720). Additionally, the $OFI_{FTTX}$ includes a second detector (730) connected to a second transimpedence amplifier (740). The outputs of the first transimpedence amplifier (720) and the second transimpedence amplifier (740) are combined using a mixer (750). After combining the signals output from the first and second transimpedence amplifiers (720, 740), the combined signal is amplified using an amplifier (760), and the desired signal is selected/identified from the combined signal in the comparator (770).

In the exemplary embodiment shown in FIG. 7, the first and second detectors (710, 730) are photodetectors which detect light that is present in the optical fiber and convert the detected light into current. The first and second transimpedence amplifiers (720, 740) convert the current signals from the photodetectors into corresponding voltage signals. In one exemplary embodiment of the present invention, the signals from the first and second amplifier (720, 740) are in phase and are combined/mixed/added together in the mixer (750) to form a composite signal.

In a situation when the user needs to identify an optical fiber at the fiber distribution hub, the user may not know which direction of the signals in the fiber is towards the ONU, because the fibers may be intertwined. However, summing the two signals allows the user to detect the desired signal, for example the upstream signal from the ONU, by clamping on the fiber from any orientation. In other words, the two detectors allow the clamping portion of the $OFI_{FTTX}$ to become direction independent.

The comparator (770) will select/identify the desired signal from among the signals within the combined signal. Next, the comparator (770) can output the identified or desired signal to the CPU (not pictured), which will relay this data to the user through signal indicators, such as for example the Desired Signal indicator (230) or No Signal indicator (240). It will be understood that, in one exemplary embodiment of the present invention, any function of the optical fiber identifier may be performed using digital logic.

In one exemplary embodiment of the present invention, circuits used to accomplish the functions described above may be AC-coupled. That is, because the signal to be detected is a high frequency signal, AC-coupling will not detrimentally impact the signal as can occur in the related art OFI systems. However, the $OFI_{FTTX}$ devices described herein are not limited to AC-coupled devices and in other exemplary embodiments of the present invention the $OFI_{FTTX}$ receiver may be DC-Coupled.

Additionally, the gain bandwidth product (GBP) must be properly set for the amplifier used in the exemplary embodiment of the present invention described above. The GBP allows the user to determine the maximum gain that can be extracted from the device for a given bandwidth and vice versa. In the $OFI_{FTTX}$ according to one exemplary embodiment of the present invention, the gain-bandwidth product is much larger than that of related art OFIs. More specifically, in one exemplary embodiment of the present invention, the gain-bandwidth product of the $OFI_{FTTX}$ is on the order of $10^{14}$ V/Ahz, as compared to $10^9$ V/Ahz for related art OFIs.

By increasing the GBP as described above, the $OFI_{FTTX}$ according to one exemplary embodiment of the present invention can detect high speed signals being transmitted through the optical fiber. More specifically, the GBP is set to identify the desired signals present on the optical fiber. In one exemplary embodiment, the GBP is fixed into the hardware, however, other embodiments may allow the user to control the GBP as desired.

In addition to simply detecting the ONU, other exemplary embodiments of the $OFI_{FTTX}$ have the potential to measure the ONU peak power. Measuring the peak power would allow providers to detect low power levels before bit error rates increase. Adding automatic gain control circuits to the $OFI_{FTTX}$ would also allow for an increased range of measurements.

Although the exemplary embodiment of the present invention have been described, it will be understood by those skilled in the art that the present invention should not be limited to the described exemplary embodiments, but various changes and modifications can be made within the spirit and the scope of the present invention. Accordingly, the scope of the present invention is not limited to the described range of the following claims.

What is claimed is:

1. A signal identifying apparatus for an optical fiber, comprising:
    a detecting portion that detects a signal originating from a first end of the optical fiber and a signal originating from a second end of the optical fiber; and
    an identifying portion that identifies a desired signal by separating the signal originating from the first end of the optical fiber from the signal originating from the second end of the optical fiber,
    wherein the detecting portion calculates a minimum detection bandwidth based on a duty cycle of the desired signal.

2. The signal identifying apparatus of claim 1, wherein the identifying portion comprises a filter, and wherein parameters of the filter correspond to the desired signal.

3. The signal identifying apparatus of claim 2, wherein the filter is a low pass filter.

4. The signal identifying apparatus of claim 2, wherein the filter is a band pass filter.

5. The signal identifying apparatus of claim 2, wherein the parameters of the filter may be adjusted to a detect a signal having at least one of a specified duty cycle and bandwidth of the desired signal.

6. The signal identifying apparatus of claim 2, wherein the signal originating from the first end of the optical fiber is a burst of short pulses and the signal originating from the second end of the optical fiber is a series of short pulses.

7. The signal identifying apparatus of claim 1, wherein the detecting portion further comprises a first detector that detects the signal originating from the first end of the optical fiber and a second detector that detects the signal originating from the second end of the optical fiber.

8. The signal identifying apparatus of claim 1, further comprising a mixing portion that combines the signal originating from the first end of the optical fiber and the signal originating from the second end of the optical fiber into a mixed signal.

9. The signal identifying apparatus of claim 1, wherein the signal originating from the first end of the optical fiber and the signal originating from the second end of the optical fiber have different frequencies.

10. The signal identifying apparatus of claim 1, wherein the signal originating from the first end of the optical fiber is an upstream signal and the signal originating from the second end of the optical fiber is a downstream signal.

11. The signal identifying apparatus of claim 10, wherein the upstream signal is the desired signal.

12. The signal identifying apparatus of claim 1, wherein the signal originating from the first end of the optical fiber and the signal originating from the second end of the optical fiber are detected without disconnecting the first or the second end of the optical fiber.

13. The signal identifying apparatus of claim 1, further comprising a power detector that measures peak power of the signal originating from the first end of the optical fiber and peak power of the signal originating from the second end of the optical fiber.

14. The signal identifying apparatus of claim 1, wherein the signal originating from the first end of the optical fiber and the signal originating from the second end of the optical fiber are detected without disrupting traffic transmitted through the optical fiber.

15. The signal identifying apparatus of claim 1, wherein the identifying portion indicates whether the desired signal is present.

16. The signal identifying apparatus of claim 1, wherein the identifying portion and the detecting portion are AC-coupled.

17. The signal identifying apparatus of claim 1, wherein the identifying portion and the detecting portion are DC-coupled.

18. A signal identifying apparatus for an optical fiber, comprising:
a detecting portion that detects a signal originating from a first end of the optical fiber and a signal originating from a second end of the optical fiber, wherein the signal originating from the first end of the optical fiber is an upstream signal and the signal originating from the second end of the optical fiber is a downstream signal;
a mixing portion that combines the upstream signal and the downstream signal; and
an identifying portion that identifies a desired signal by separating the upstream signal and the downstream signal,
wherein the detecting portion calculates a minimum detection bandwidth based on a duty cycle of the desired signal.

19. A method of identifying signals in an optical fiber, comprising:
detecting a signal originating from a first end of the optical fiber;
detecting a signal originating from a second end of the optical fiber; and
identifying a desired signal by separating the signal originating from the first end of the optical fiber from the signal originating from the second end of the optical fiber,
wherein the detecting a signal originating from a first end of the optical fiber and detecting a signal originating from a second end of the optical fiber further comprise calculating a minimum detection bandwidth based on a duty cycle of the desired signal.

20. The method of claim 19, wherein the signal originating from the first end of the optical fiber is separated from the signal originating from the second end of the optical fiber according to parameters of the desired signal.

21. The method of claim 20, wherein the signal originating from the first end of the optical fiber is separated from the signal originating from the second end of the optical fiber using a low pass filter.

22. The method of claim 20, wherein the signal originating from the first end of the optical fiber is separated from the signal originating from the second end of the optical fiber using a band pass filter.

23. The method of claim 20, wherein the parameters comprise duty cycle of the desired signal and bandwidth of the desired signal.

24. The method of claim 19, further comprising combining the signal originating from the first end of the optical fiber and the signal originating from the second end of the optical fiber into a mixed signal.

25. The method of claim 19, wherein the signal originating from the first end of the optical fiber and the signal originating from the second end of the optical fiber are detected without disconnecting the first or the second end of the optical fiber.

26. The method of claim 19, further comprising measuring peak power of the signal originating from the first end of the optical fiber and peak power of the signal originating from the second end of the optical fiber.

27. The method of claim 19, wherein the signal originating from the first end of the optical fiber and the signal originating from the second end of the optical fiber are detected without disrupting traffic transmitted through the optical fiber.

28. The method of claim 19, further comprising indicating whether the desired signal is present.

* * * * *